United States Patent
Ghosh et al.

(10) Patent No.: US 11,184,082 B2
(45) Date of Patent: Nov. 23, 2021

(54) CELLULAR TELEPHONY

(71) Applicant: EE Limited, Hatfield (GB)

(72) Inventors: Ayan Ghosh, London (GB); Mansoor Hanif, London (GB)

(73) Assignee: EE Limited, Hatfield (GB)

( * ) Notice: Subject to any disclaimer, the term of this patent is extended or adjusted under 35 U.S.C. 154(b) by 158 days.

(21) Appl. No.: 16/338,158

(22) PCT Filed: Aug. 15, 2017

(86) PCT No.: PCT/EP2017/070690
§ 371 (c)(1),
(2) Date: Mar. 29, 2019

(87) PCT Pub. No.: WO2018/059820
PCT Pub. Date: Apr. 5, 2018

(65) Prior Publication Data
US 2020/0028569 A1    Jan. 23, 2020

(30) Foreign Application Priority Data

Sep. 29, 2016 (EP) .................................. 16191547

(51) Int. Cl.
*H04W 56/00* (2009.01)
*H04B 7/185* (2006.01)
(Continued)

(52) U.S. Cl.
CPC ....... *H04B 7/18504* (2013.01); *G05D 1/0094* (2013.01); *G05D 1/101* (2013.01);
(Continued)

(58) Field of Classification Search
CPC ........... H04B 7/18504; H04B 7/18506; H04W 24/08; H04W 36/08; H04W 36/26; H04W 84/042; G05D 1/0094; G05D 1/101
(Continued)

(56) References Cited

U.S. PATENT DOCUMENTS 4,842,221 A    6/1989 Beach et al.
6,325,330 B1    12/2001 Lavan, Jr.
(Continued)

FOREIGN PATENT DOCUMENTS

CN    105083520 A    11/2015
WO    WO 02/01756 A1    1/2002
(Continued)

OTHER PUBLICATIONS

International Search Report and Written Opinion for corresponding PCT Application No. PCT/EP2017/070689, dated Oct. 11, 2017, 10 pages.
(Continued)

*Primary Examiner* — Sai Ming Chan
(74) *Attorney, Agent, or Firm* — Patterson Thuente Pedersen, P.A.

(57) ABSTRACT

A communications base station is mounted on an aircraft such as a drone or a tethered balloon to provide wireless coverage over a remote area. The use of an airborne device allows a much wider coverage area to be served by one base station, and therefore one backhaul connection, than would be possible by ground based antennas. Power and maintenance savings are achieved as the aircraft is launched only when activity is detected on the ground in the area of coverage, and returns to a ground station when such activity ceases. Activity may be detected for example by sensors on a highway identifying vehicles approaching the coverage area.

12 Claims, 4 Drawing Sheets

(51) Int. Cl.
*G05D 1/00* (2006.01)
*G05D 1/10* (2006.01)
*H04W 24/08* (2009.01)
*H04W 36/08* (2009.01)
*H04W 36/26* (2009.01)
*H04W 84/04* (2009.01)

(52) U.S. Cl.
CPC ........ *H04B 7/18506* (2013.01); *H04W 24/08* (2013.01); *H04W 36/08* (2013.01); *H04W 36/26* (2013.01); *H04W 84/042* (2013.01)

(58) Field of Classification Search
USPC .......................................................... 370/316
See application file for complete search history.

(56) References Cited

U.S. PATENT DOCUMENTS

| | | | |
|---|---|---|---|
| 8,068,937 | B2 | 11/2011 | Eaves |
| 8,781,637 | B2 | 7/2014 | Eaves |
| 9,184,795 | B2 | 11/2015 | Eaves |
| 2007/0200027 | A1 | 8/2007 | Johnson |
| 2009/0204268 | A1 | 8/2009 | Eaves |
| 2012/0075759 | A1 | 3/2012 | Eaves |
| 2013/0103220 | A1 | 4/2013 | Eaves |
| 2014/0233412 | A1 | 8/2014 | Mishra et al. |
| 2015/0215001 | A1 | 7/2015 | Eaves |
| 2016/0046387 | A1 | 2/2016 | Frolov et al. |
| 2016/0111877 | A1 | 4/2016 | Eaves et al. |
| 2016/0134331 | A1 | 5/2016 | Eaves |
| 2016/0191142 | A1* | 6/2016 | Boss ................ H04W 28/0289 455/405 |
| 2016/0363457 | A1* | 12/2016 | Jelavic ................ G01C 21/3492 |
| 2018/0077518 | A1* | 3/2018 | Nguyen ................ H04W 84/00 |

FOREIGN PATENT DOCUMENTS

| | | | |
|---|---|---|---|
| WO | WO 2002/061971 | A1 | 8/2002 |
| WO | WO 2009/005875 | A2 | 1/2009 |
| WO | WO 2014/089329 | A2 | 6/2014 |
| WO | WO 2015/139733 | A1 | 9/2015 |
| WO | WO 2016/012055 | A1 | 1/2016 |
| WO | WO 2018/036870 | A1 | 3/2018 |

OTHER PUBLICATIONS

Kolar, et al.; "Conceptualization and Multiobjective Optimization of the Electric System of an Airborne Wind Turbine", IEEE Journal of Emerging and Selected Topics in Power Electronics, vol. 1, No. 2, 2168-6777. Jun. 2013; 31 pages.

GB Search Report from corresponding GB Application No. GB1614341.4, search completed: Feb. 2, 2017.

Application and Filing Receipt for U.S. Appl. No. 16/325,814, filed Feb. 15, 2019, Inventor(s): Ghosh et al.

International Search Report and Written Opinion for corresponding PCT Application No. PCT/EP2017/070690, dated Nov. 23, 2017, 14 pages.

Extended European Search Report corresponding EP Application No. 16191547.5, dated Mar. 31, 2017, 14 pages.

GB Search and Examination Report for GB Application No. GB1616558.1; dated Mar. 8, 2017; 5 pages.

Tian He et al: "VigiiNet: An Integrated Sensor Network System for Energy-Efficient Surveillance", ACM Transactions on Sensor Networks, Acm, 2 Penn Plaza, Suite 701 New York NY 10121-0701 USA, val. 2, No. 1, Feb. 1, 2006, pp. 1-38.

Valcarce et al: "Airborne Base Stations for Emergency and Temporary Events" In: Lecture Notes of the Institute for Computer Sciences, Social Informatics and Telecommunications Engineering, Jun. 27, 2013 (Jun. 27, 2013), Springer, DE, XP055357 418, ISSN: 1867-8211 ISBN: 978-3-642-17758-3 val. 123, pp. 13-25, DO1: 1 0.1 007 /978-3-319-02762-3_2; 12 pages.

Zhenhong et al: "A Rapid and Reliable Disaster Emergency Mobile Communication System via Aerial Ad Hoc BS Networks", Wireless Communications, Networking and Mobile Computing (WICOM), 2011 7th International Conference on, IEEE, Sep. 23, 2011, pp. 1-4, ; 4 pages.

Chandrasekharan et al: "Designing and Implementing Future Aerial Communication Networks", IEEE Communications Magazine, IEEE Service Center, Piscataway, US; May 1, 2016; 9 pages.

* cited by examiner

CELLULAR TELEPHONY

CROSS-REFERENCE TO RELATED APPLICATION

The present application is a National Phase entry of PCT Application No. PCT/EP2017/070690, filed Aug. 15, 2017, which claims priority from EP Patent Application No. 16191547.5 filed Sep. 29, 2016 each of which is hereby fully incorporated herein by reference.

TECHNICAL FIELD

The present disclosure relates to cellular telephony, and in particular to the provision of cellular telephony coverage in remote areas.

BACKGROUND

Cellular coverage is provided by a network of radio transceivers (base stations) which are capable of radio communication with mobile handsets, and have a backhaul connection, usually but not invariably over a fixed connection, to the rest of the network.

Each base station has an area of coverage which is dependent on factors such as line of sight, but primarily on the transmission and receive strength of the base station. In busy areas, base stations are relatively close together, with signal strength kept down to a level which allows channel re-use over relatively short distances without interference, but in more remote areas where communications traffic is lighter, it is desirable to space the base stations as far apart as possible without leaving significant gaps in coverage. In practice the maximum spacing is determined by the distance of the horizon, (which in turn depends on the height of the transceiver above the ground), and on how mountainous the terrain is.

The cost of coverage in very remote areas of land or sea can be significant in relation to the amount of communications traffic expected. There can also be environmental objections to the presence of very tall masts, or of several smaller ones, in such areas. There is also a requirement for such transceivers to be supported by a power supply and a backhaul connection, which can be a significant cost for a relatively small potential communications traffic level. However, because of their very remoteness it is desirable that coverage can be provided to allow for communication with people travelling into such areas, in case of emergencies.

It is known to provide temporary coverage for locations which do not normally have coverage available by installing portable "femtocell" transceivers at such a location when the need arises. Such devices are intended for short range communication, usually in indoor locations. The backhaul connection is usually provided through a fixed connection, such as an Ethernet connection to the internet. Such an arrangement is clearly not practical in a remote area where there is no other communication infrastructure available.

It is known to provide temporary wireless coverage for an event in a remote area by mounting the base station equipment on an aircraft. Typically, because coverage may be required for some time, the aircraft is unmanned, and is usually tethered to a ground anchor to ensure it maintains position. The tether can also provide a convenient means for the backhaul connections and/or a power supply, although satellite communication and solar power are respective possible self-contained alternatives. The aircraft can be a lighter-than-air craft such as a balloon, or a powered heavier-than-air such as a "drone". An example is discussed in our co-pending European Application No. 16185219.9 filed on Aug. 22, 2016. Such arrangements have the ability to hold station at high levels, therefore providing coverage over a wide area, without the need for a tower or mast to be constructed. They are therefore also suited for temporary events.

Although such arrangements can be used when it is known, or expected, that cellular communications traffic is to be required in the remote area, for example during a military operation, a sporting event in a desert or marine area, or in support of a search and rescue operation, it would be unduly expensive to maintain such a base station airborne permanently. In particular, although such a base station may be launched in support of a search and rescue operation, it will not be available to take the initial distress call that might initiate such an operation.

SUMMARY

According to the present disclosure, there is provided a method of operating an aircraft carrying communications equipment for operation as a communications base station for provision, when airborne, of wireless communications connections over a coverage area, in which a monitoring system is responsive to detection of activity on the ground in the area of coverage to cause launch of the aircraft, and to return the aircraft to the ground when activity ceases.

According to another aspect, the disclosure provides a control system for operating an aircraft, comprising a monitoring system for detection of activity in a predetermined region served by the aircraft, a flight control system responsive to the monitoring system for launching the aircraft when activity is detected by the monitoring system, and a telecommunications registration processor for establishing communication between a communications base station carried by the aircraft and one or more mobile communications terminals in the coverage area.

In one embodiment, the aircraft is returned to the ground when activity ceases. The monitoring system may comprise sensors on a highway identifying vehicles approaching the coverage area. In an alternative arrangement, launch may be triggered by a handover signal received over the backhaul connection from a cellular base station operating in a region neighboring the coverage area, or by detection by the network of an incoming call to a mobile terminal recorded as being in the area of coverage.

The disclosure is intended for use in remote areas, where communications traffic levels are very low and the cost of providing terrestrial base stations would be disproportionately high for the amount of communications traffic on offer. The use of an airborne device allows a much wider coverage area to be served by one base station, and therefore one backhaul connection, than would be possible by ground based antennas. The disclosure achieves power and maintenance savings by only launching the aircraft when required.

For practical reasons, it is preferable for backhaul to be provided from a ground station communicating with the aircraft. The backhaul may be a landline, or it may be a microwave or satellite connection. Such connections are difficult to operate directly from an aircraft because it is more difficult to lock on to a narrowbeam signal from a satellite or microwave station whilst in motion, and even a tethered balloon will turn in the wind.

BRIEF DESCRIPTION OF THE DRAWINGS

An embodiment of the disclosure will be described by way of example with reference to the drawings accompanying this specification, in which:

FIG. 1 depicts an airborne device 1 attached by a tether 2 to a ground station 3. The device 1 may be a balloon or a powered device such as a "drone". The tethered device 1 carries communications equipment 4 and antenna 5 for communicating, with user terminals 8, and communication means 6 providing a communication link 21 with the ground station 3. The communications link 21 may be wireless as depicted, or it may be carried through a cable or optical fiber associated with the tether 2. The ground station has a backhaul communications transceiver 25, 26 or 28 for communication with the fixed network at a mobile communications base station 7, a satellite 27, or an exchange 29 in a fixed network.

FIG. 2 depicts a cellular network comprising a number of conventional cellular base stations 10, 11, 12, 13, 14, 15, each having an associated area of coverage. It will be appreciated that in practice the boundaries are not precise, but signal strength and quality generally decline with distance. The association between mobile stations 8, 88 and base stations 10-15 is performed by a handover and registration management system 19 in a conventional manner (for clarity, a logical connection is only shown between one of the mobile stations 13 and the handover and registration management system 19.

Figure 1:
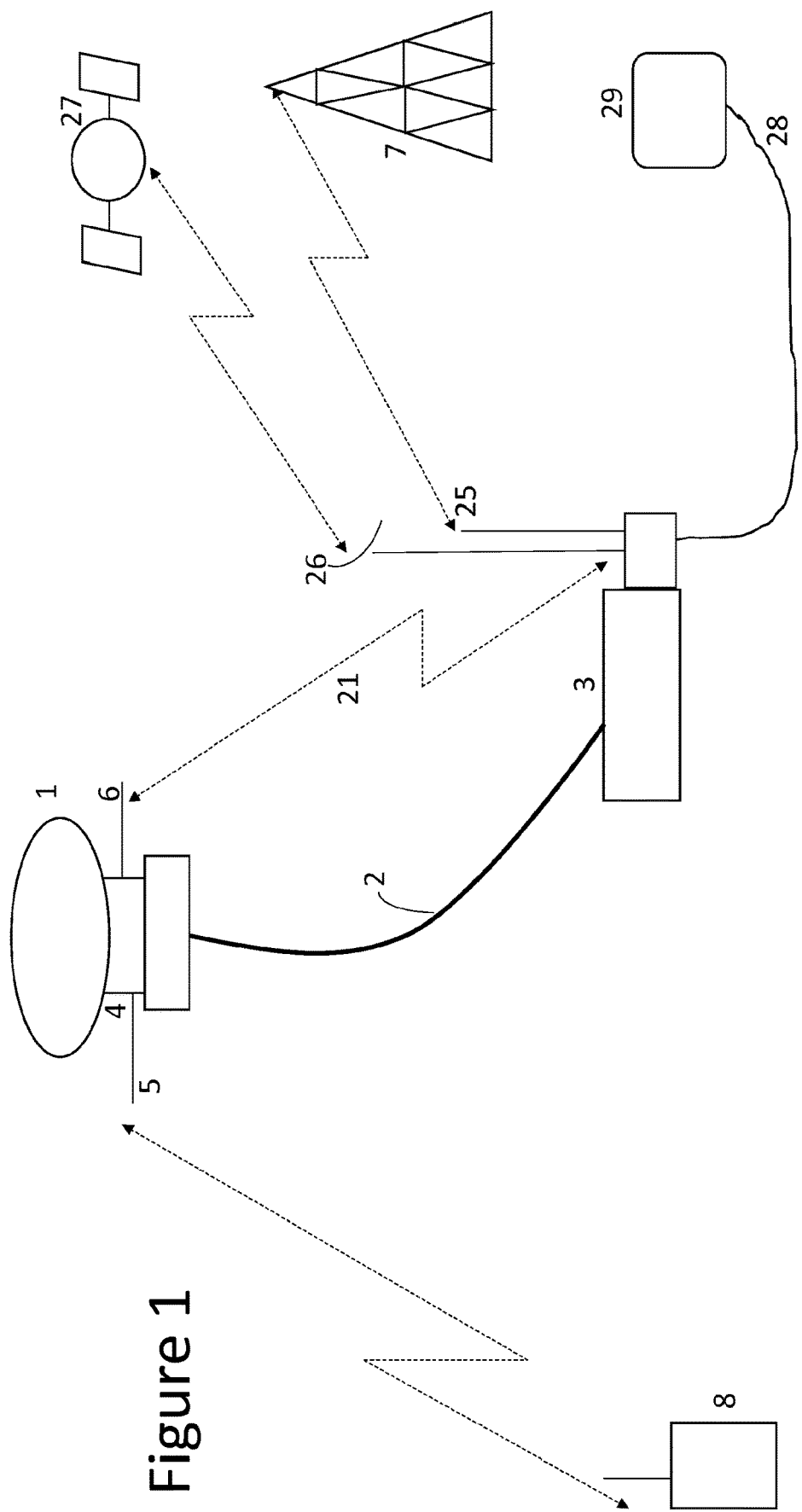
FIG. 1 is a schematic illustration of an airborne base station and associated ground station.
Figure 2:
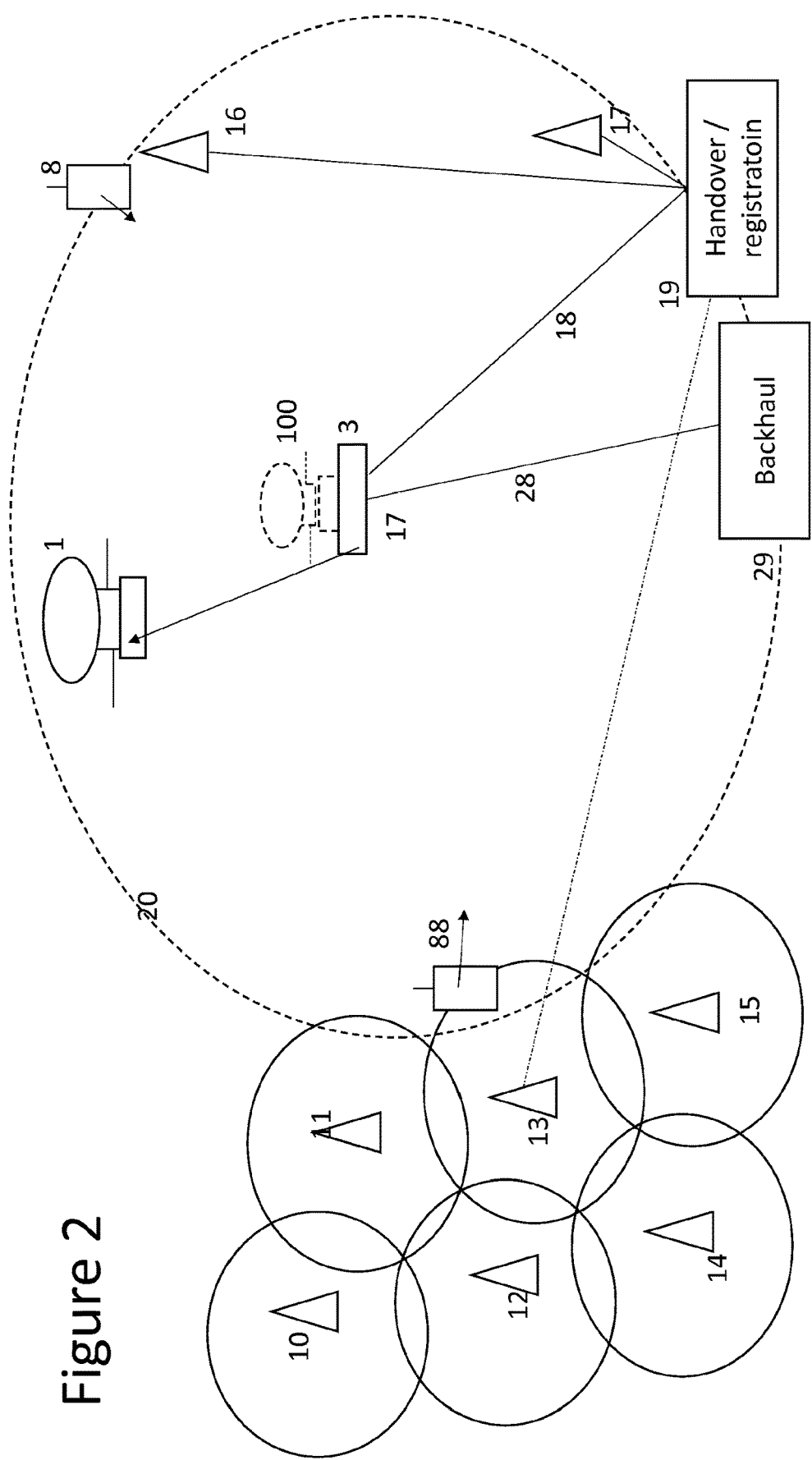
FIG. 2 is a schematic illustration of a cellular system incorporating the airborne base station of FIG. 1.

An area 20 is depicted as not being covered by any of the base stations 10-15, but can be covered by the base station 1 depicted in FIG. 1, when it is airborne. If the airborne base station 1 is capable of controlled flight, the actual area of coverage 20 may be varied according to need, for example to track a mobile terminal moving through the region, or to maximize the signal quality according to the number and locations of a number of mobile terminals in the region.

The base stations 10-15 each maintain a neighbor list of base stations to which handover can be performed if the currently serving base station (e.g. 13) detects that a mobile device 88 is moving out of its area of coverage. In the current invention, base stations 11, 13, 15 which adjoin an area 20 having no conventional coverage include the base station 1 in their neighbor list. In order to limit the use of the airborne base station 1, the airborne device is only selected to circumstances where no conventional base station on the neighbor list can detect the mobile device 88. However, it should be noted that at this point the aerial base station 1 (100) may not yet be airborne, and thus cannot yet detect the mobile device 88 itself.

Figure 3:
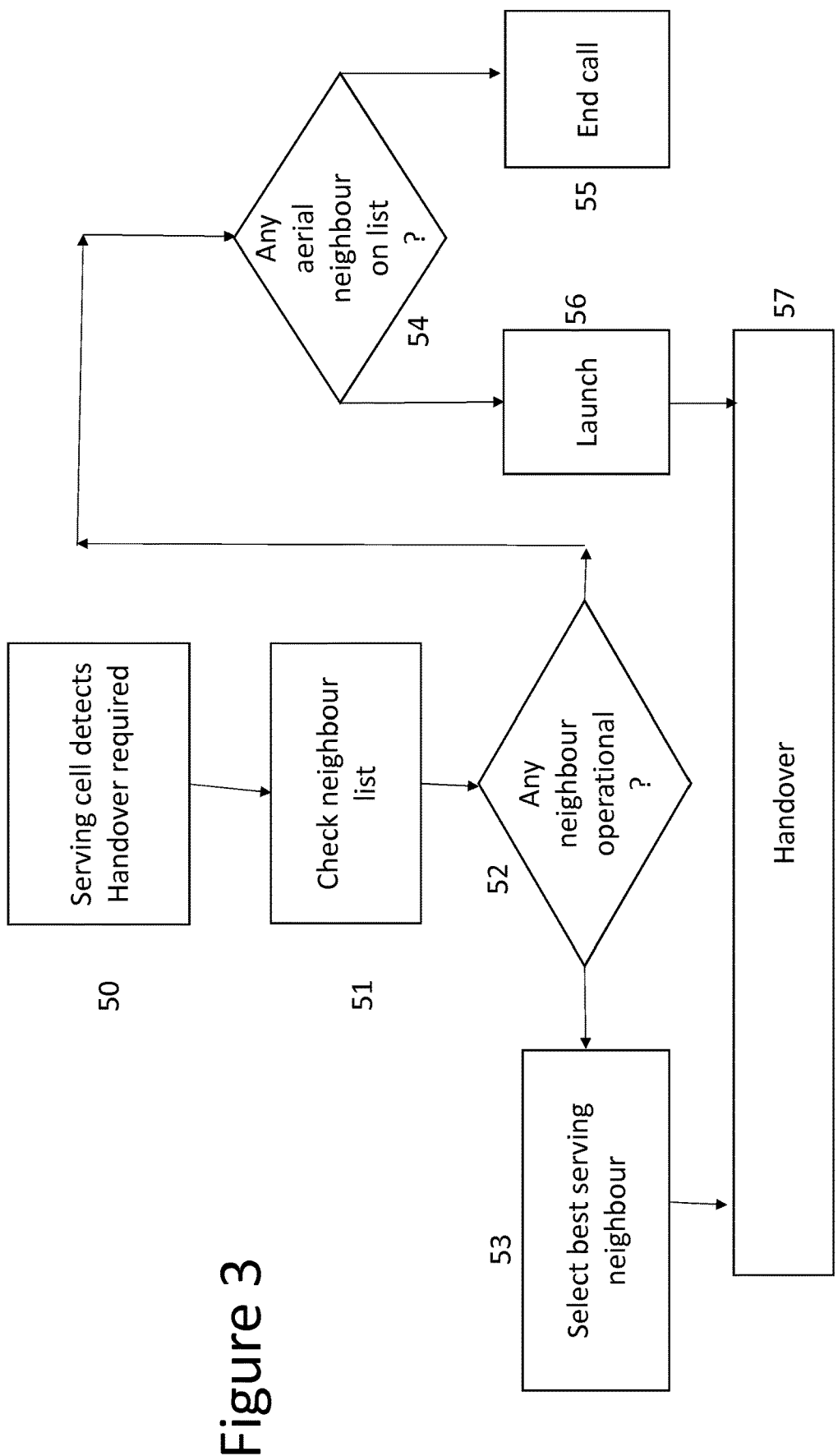
FIG. 3 is a flow chart depicting schematically the operation of a handover system according to the disclosure.

The handover process is depicted in FIG. 3.

If the handover management system 19 determines that a handover to the base station 1 is required (at 50), the handover management system 19 checks the neighbor list of the currently serving cell 13 (at 51). If any neighbor (11, 12 . . . ) is operational (at 52) the best serving neighbor is selected (step 53) and a handover (57) is performed. If no neighbor is operational, a check is made to determine if an aerial base station 100 is on the neighbor list but currently grounded (54) and thus not operational. If no such neighbor is available, the call has to be terminated (at 55) but if a grounded base station 100 is present it can be launched (at 56).

Figure 4:
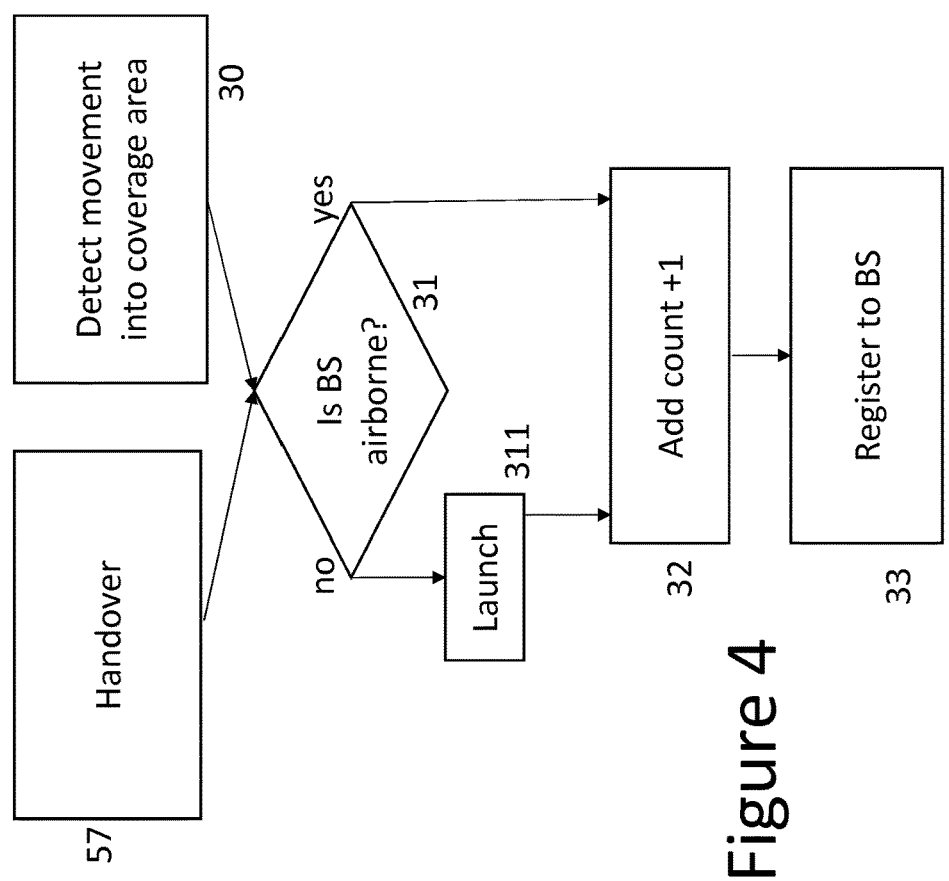
FIG. 4 is a flow chart representing the operation of the system of FIG. 2 when a mobile device moves into the area of coverage of the base station.

The modified handover process is depicted in FIG. 4. The process may be initiated 30 by the handover system 57 or by a sensor 16, 17. The handover and registration system 19 next determines if the base station 1 is already airborne (at 31) and launches it (at 311) if necessary. The ground station 3 keeps a record of the number of mobile terminals currently registered with the base station 1 (at 32) and performs the rest of the handover process 33 in a conventional manner.

Figure 5:
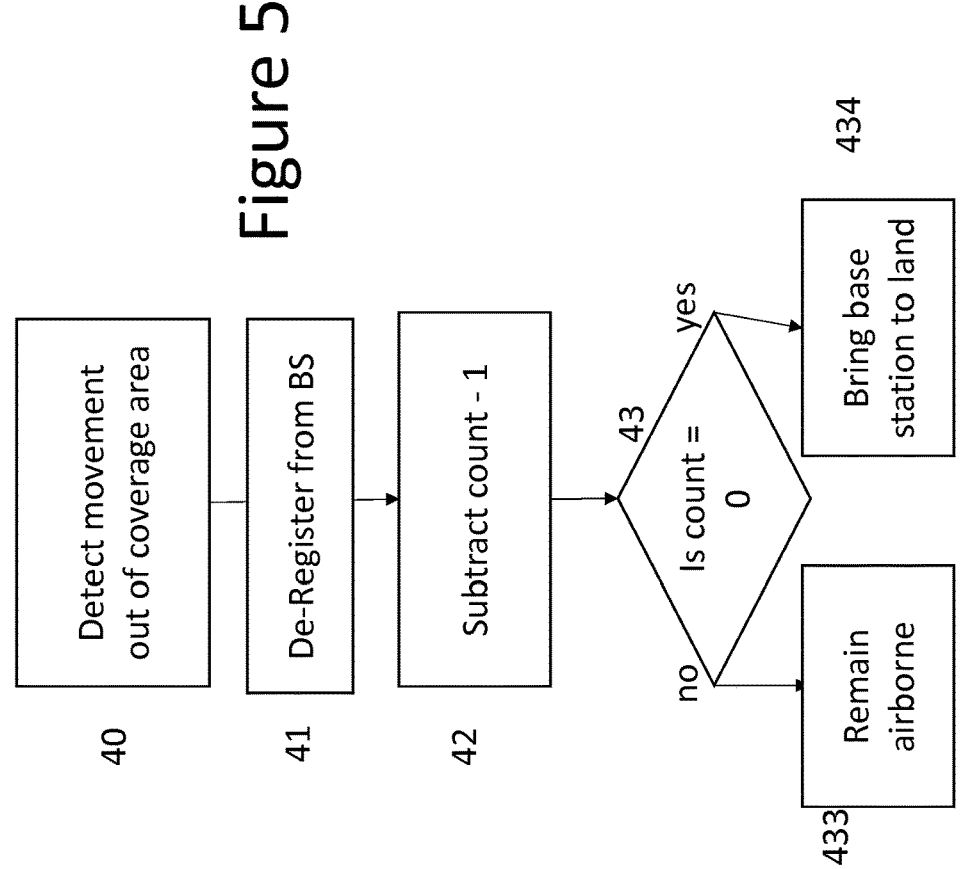
FIG. 5 is a flow chart representing the operation of the system of FIG. 2 when a mobile device moves out of the area of coverage of the base station.

As depicted in FIG. 5 handover from the serving area 20 is handled similarly, with handover 41 to another base station 13 (or to an out-of-connection process if connection is lost) causing the record of the number of terminals currently served to be reduced (at 42). The base station remains airborne (at 433) unless no mobile terminals remain registered to it (at 43), in which case it can return to the ground station 3 until required again.

The base station may also be launched if movement or activity other than handover is detected (at 30), such as movement of a vehicle 8 past a roadside beacon 16, 17 into or out of the region of coverage 20, thus allowing coverage to be provided even if no mobile terminal was active at the time of entry into the region.

In an embodiment, the ground station 3 may be arranged only to launch the aircraft if an incoming call is detected by the backhaul system 29 addressed to a mobile terminal 8, 88 currently recorded by the handover management system 19 as under the control of the base station 1. This allows mobile terminals to be paged whilst in the region 20, but of course such an arrangement would only allow incoming calls to be made.

In this specification, the term "aircraft" is intended to embrace both heavier-than-air craft and lighter-than-air craft, which may be tethered or capable of controlled flight.

The invention claimed is:

1. A method of operating an aircraft carrying communications equipment for operation as a communications base station for provision, when airborne, of wireless communications connections over a coverage area, comprising:
   causing launch of the aircraft by a monitoring system responsive to detection of activity on the ground in the coverage area; and
   returning the aircraft to the ground when the activity ceases,
   wherein the wireless communications connections are a cellular telephony network and wherein the launch is initiated in response to detection, by a communications handover control system, of an attempt to handover communications with a mobile terminal in the coverage area of the communications base station.

2. The method according to claim 1, wherein the aircraft is returned to the ground when no mobile terminal is currently connected to the base station.

3. The method according to claim 1, wherein the monitoring system comprises sensors identifying vehicles entering and leaving the coverage area.

4. The method according to claim 3, wherein a tally is kept of a number of vehicles in the coverage area, and the aircraft is returned to the ground when the tally reaches zero.

5. A method according to claim 1, wherein a position of the aircraft is controlled to align with an area of activity within a larger region over which the aircraft is capable of operation.

6. A control system for operating an aircraft, comprising:
a monitoring system for detection of activity in a predetermined region served by the aircraft;
a flight control system responsive to the monitoring system for launching the aircraft when activity is detected by the monitoring system in the predetermined region; and
a telecommunications registration processor for establishing communication between a communications base station carried by the aircraft and one or more mobile communications terminals in the predetermined region,
wherein the control system is comprised in a registration and handover processor for a cellular telephone system, and configured to launch the aircraft in an event of a handover or registration of a mobile cellular terminal within the predetermined region.

7. The control system according to claim 6, wherein the monitoring system comprises one or more activity sensors disposed within the predetermined region.

8. The control system according to claim 7, wherein the flight control system is arranged to control movement of the aircraft within the predetermined region according to changes in the activity detected by one or more of the activity sensors.

9. The control system according to claim 7, further comprising a counter for counting a number of mobile terminals detected by the activity sensors, wherein the flight control system is arranged to land the aircraft if the counter determines that the number of mobile terminals has reached zero.

10. The control system according to claim 6, wherein the handover is effected by inclusion of the communications base station carried by the aircraft in neighbor lists of cellular base stations in areas neighboring the predetermined region.

11. The control system according to claim 10, wherein the control system is arranged to include the communications base station carried by the aircraft in the neighbor list both when the aircraft is airborne and the communications base station is operational, and when the aircraft is on the ground but available to launch.

12. The control system according to claim 10, wherein the control system is arranged such that handover to the communications base station carried by the aircraft is arranged only if handover is not possible to another communications base station on the neighbor list.

* * * * *